United States Patent
Oshima et al.

(10) Patent No.: US 10,496,221 B2
(45) Date of Patent: Dec. 3, 2019

(54) POSITION DETECTION DEVICE, IMAGE DISPLAY DEVICE AND IMAGE DISPLAY SYSTEM

(71) Applicant: RICOH COMPANY, Ltd., Tokyo (JP)

(72) Inventors: Yoshiaki Oshima, Kanagawa (JP); Noritada Ohi, Saitama (JP); Katsuyuki Omura, Tokyo (JP); Masafumi Nagao, Kanagawa (JP); Naoyuki Ishikawa, Kanagawa (JP); Seiko Yamamoto, Tokyo (JP); Masanobu Yamagata, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 15/992,441

(22) Filed: May 30, 2018

(65) Prior Publication Data

US 2018/0275819 A1    Sep. 27, 2018

Related U.S. Application Data

(63) Continuation of application No. PCT/JP2016/085794, filed on Dec. 1, 2016.

(30) Foreign Application Priority Data

Dec. 2, 2015 (JP) .................................. 2015-235410
Jun. 20, 2016 (JP) .................................. 2016-121607

(51) Int. Cl.
*G06F 3/041* (2006.01)
*G06F 3/042* (2006.01)
(Continued)

(52) U.S. Cl.
CPC ........ *G06F 3/0416* (2013.01); *G06F 3/03542* (2013.01); *G06F 3/0421* (2013.01);
(Continued)

(58) Field of Classification Search
CPC .... G06F 3/0416; G06F 3/0428; G06F 3/0488; G06F 3/0421; G06F 3/03542; G06F 3/03545; G09G 2380/06; G09G 3/002
See application file for complete search history.

(56) References Cited

U.S. PATENT DOCUMENTS 6,608,619 B2    8/2003    Omura et al.
7,333,094 B2    2/2008    Lieberman et al.
(Continued)

FOREIGN PATENT DOCUMENTS

JP    2006-134362    5/2006
JP    2008-176802    7/2008
(Continued)

OTHER PUBLICATIONS

International Search Report dated Jan. 10, 2017 in PCT/JP2016/085794 filed on Dec. 1, 2016.
(Continued)

*Primary Examiner* — Andrew Sasinowski
(74) *Attorney, Agent, or Firm* — Xsensus LLP

(57) ABSTRACT

A position detection device for detecting positions of a non-emitter and an emitter in a detection area includes one or more reflective members disposed around the detection area, illumination light sources to emit light toward the reflective member, light receiving sensors to receive light from the reflective member and light from the light emitter, and a control device to control the illumination light sources and the light emitter. Based on previous detection statuses of the non-light emitter and the light emitter, the control device sets a time ratio of a time of a non-light emitter detection mode to a time of a light emitter detection mode, and sets timings of the non-light emitter detection mode and the light emitter detection mode.

15 Claims, 22 Drawing Sheets

(51) Int. Cl.
*G06F 3/0354* (2013.01)
*G06F 3/0488* (2013.01)
*G09G 3/00* (2006.01)

(52) U.S. Cl.
CPC .......... *G06F 3/0428* (2013.01); *G06F 3/0488* (2013.01); *G06F 3/03545* (2013.01); *G09G 3/002* (2013.01); *G09G 2380/06* (2013.01)

(56) References Cited

U.S. PATENT DOCUMENTS

| | | | | |
|---|---|---|---|---|
| 2008/0055266 A1* | 3/2008 | Harada | ................. | G06F 3/0421 345/173 |
| 2013/0153753 A1* | 6/2013 | Hung | ....................... | G01J 1/18 250/208.2 |
| 2015/0077763 A1* | 3/2015 | Maki | .................... | G06F 3/0428 356/614 |

FOREIGN PATENT DOCUMENTS

| JP | 2014-021790 | 2/2014 |
|---|---|---|
| JP | 5415954 | 2/2014 |
| JP | 2015-056112 | 3/2015 |
| JP | 2017-117069 | 6/2017 |

OTHER PUBLICATIONS

Written Opinion dated Jan. 10, 2017 in PCT/JP2016/085794 filed on Dec. 1, 2016.

* cited by examiner

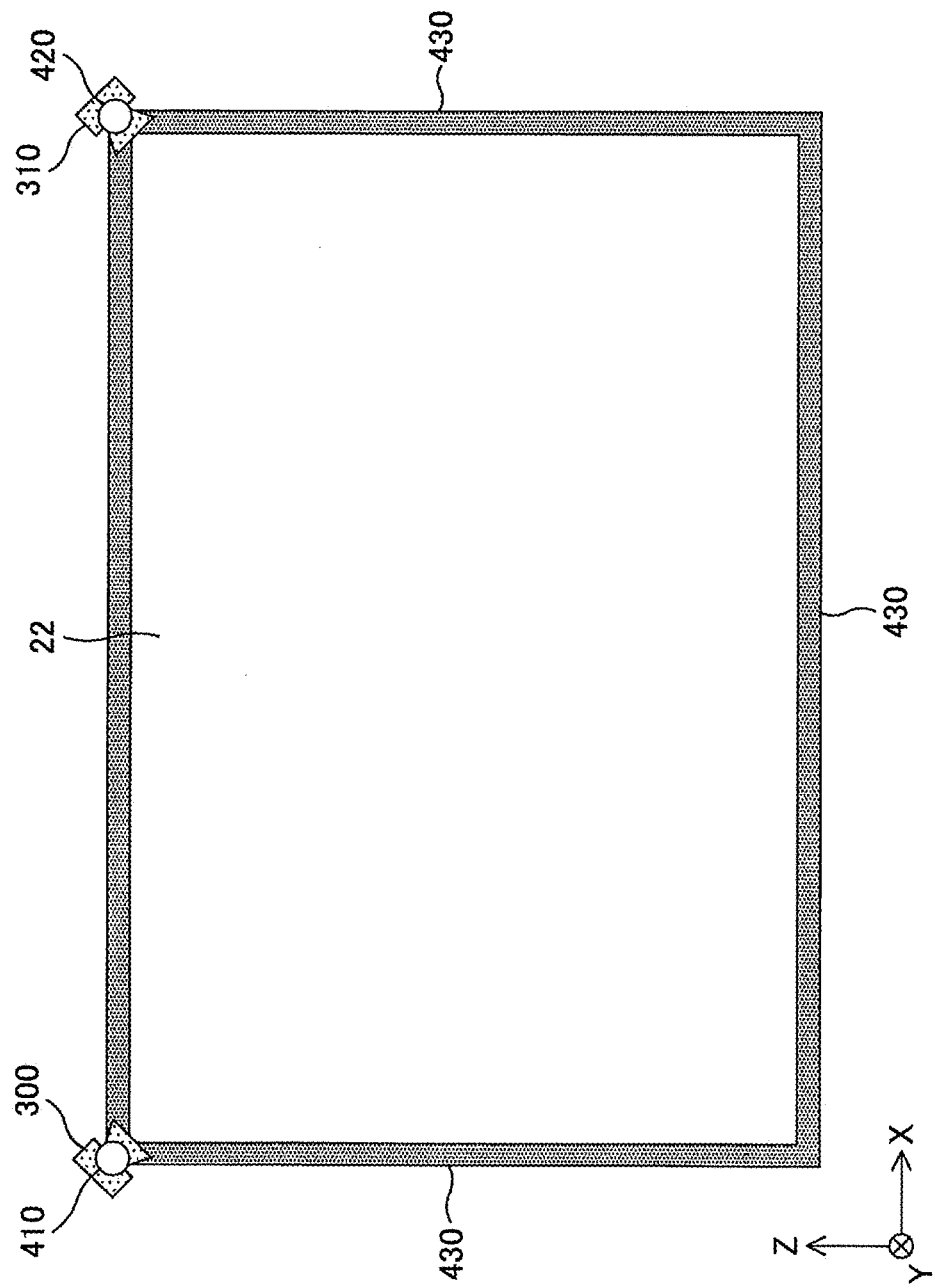

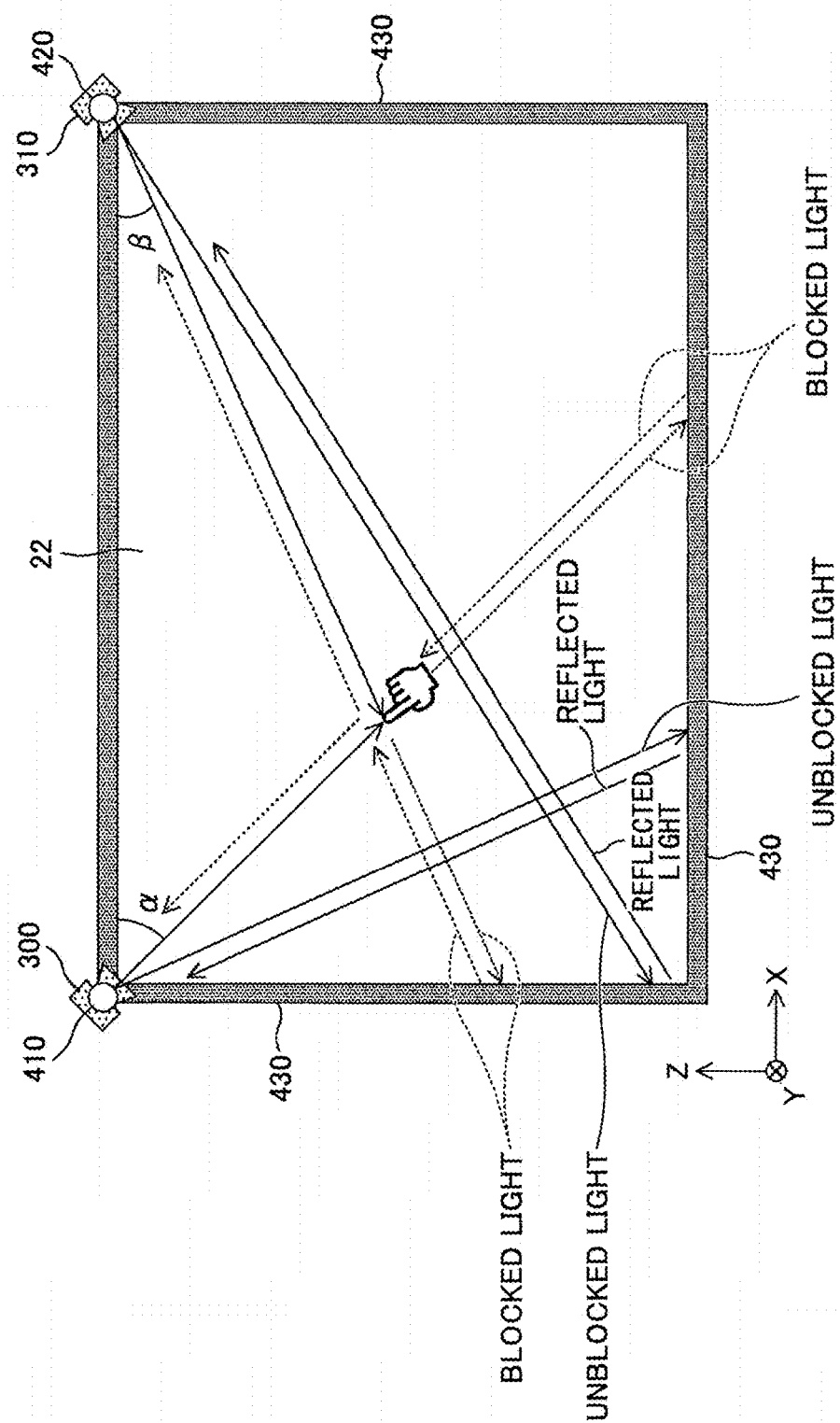
FIG.6 (NON-LIGHT EMITTER DETECTION MODE)

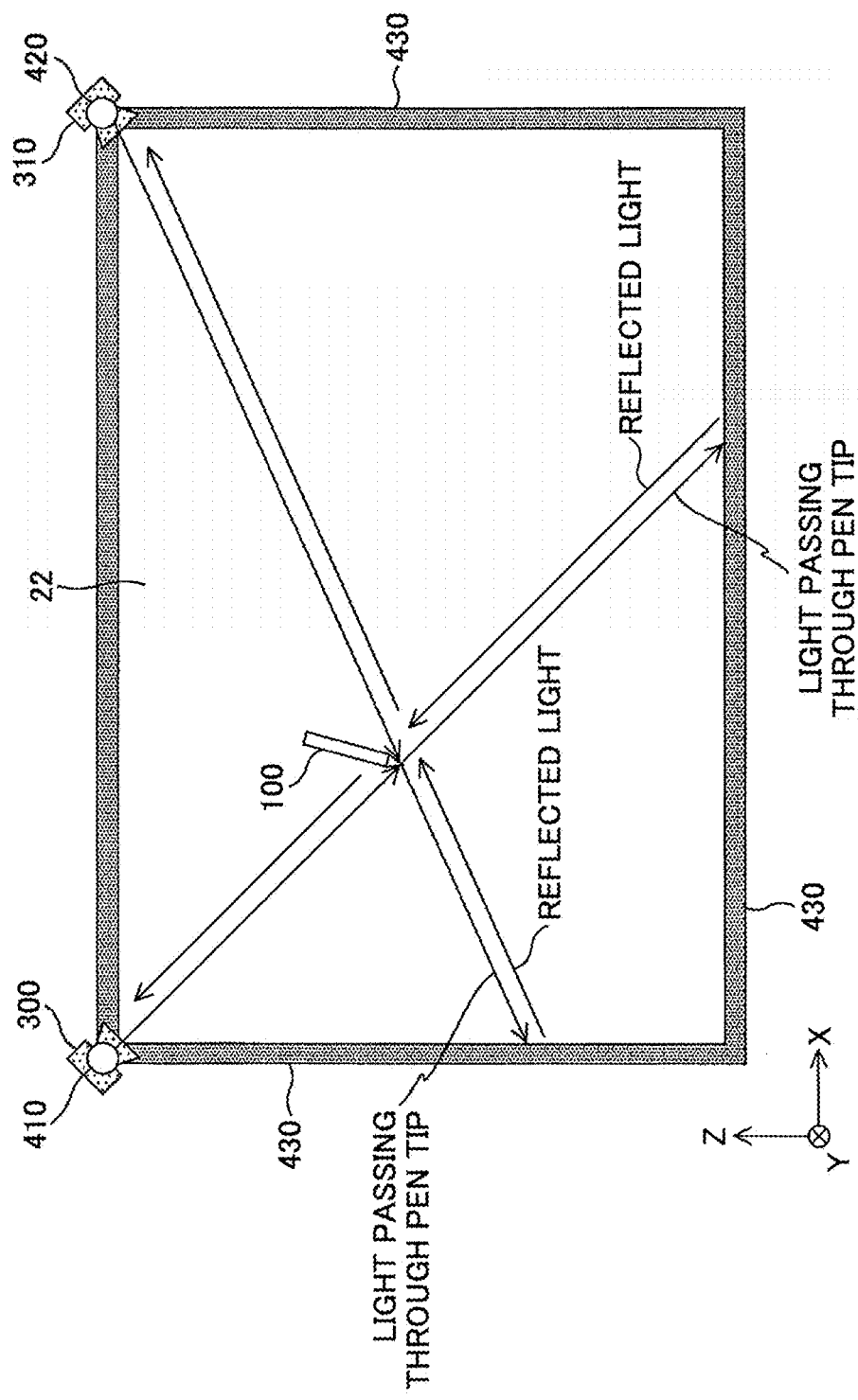

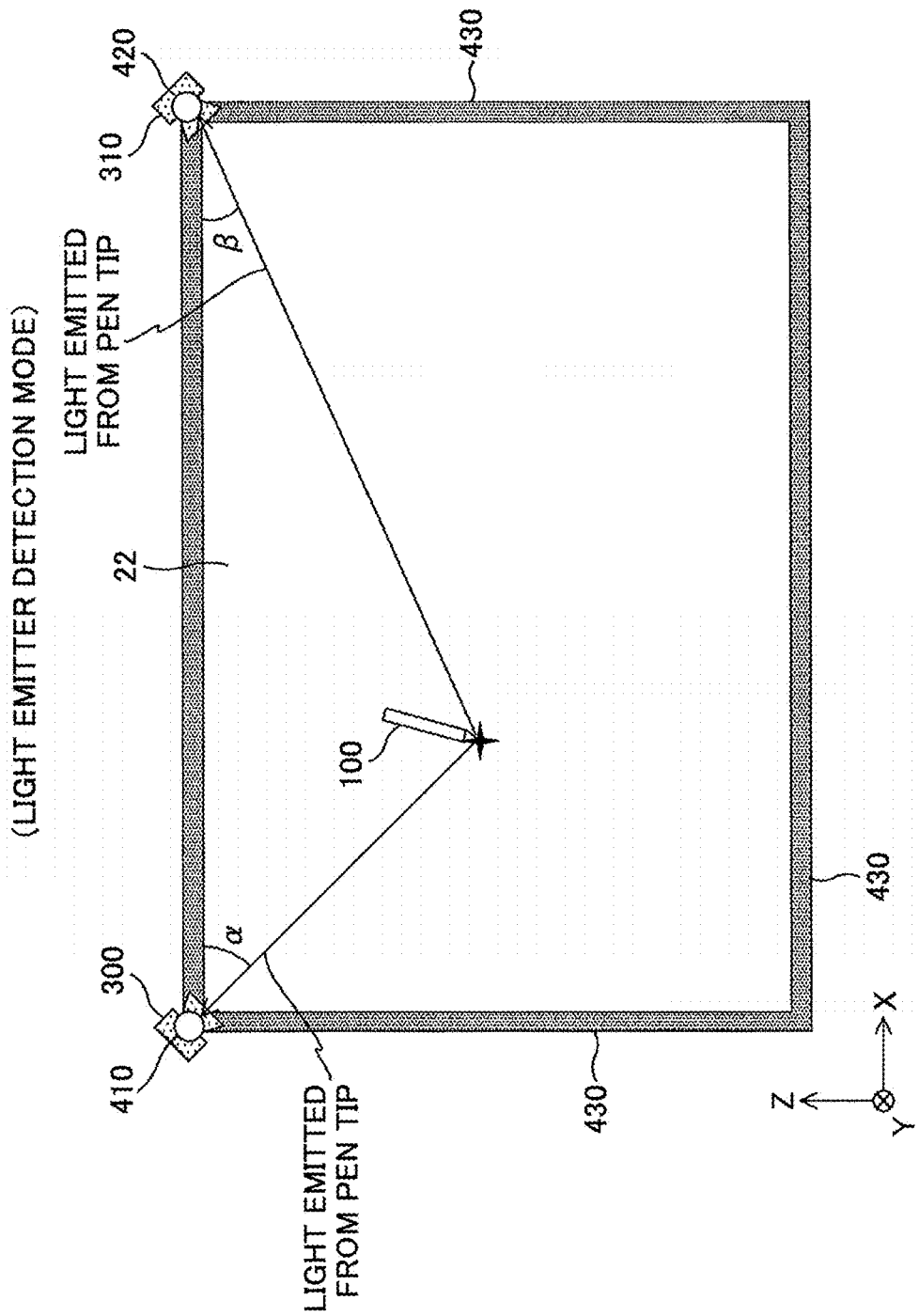

FIG.11

| DETECTION MODE | ILLUMINATION LIGHT SOURCE 410 | ILLUMINATION LIGHT SOURCE 420 | LIGHT EMITTING UNIT 102 | CALCULATION OF TILT ANGLE WITH RESPECT TO POSITION SENSOR |
|---|---|---|---|---|
| NON-LIGHT EMITTER DETECTION MODE | ON | ON | OFF | CALCULATION FROM PIXEL POSITION WITH MINIMUM AMOUNT OF RECEIVED LIGHT |
| LIGHT EMITTER DETECTION MODE | OFF | OFF | ON | CALCULATION FROM PIXEL POSITION WITH MAXIMUM AMOUNT OF RECEIVED LIGHT |

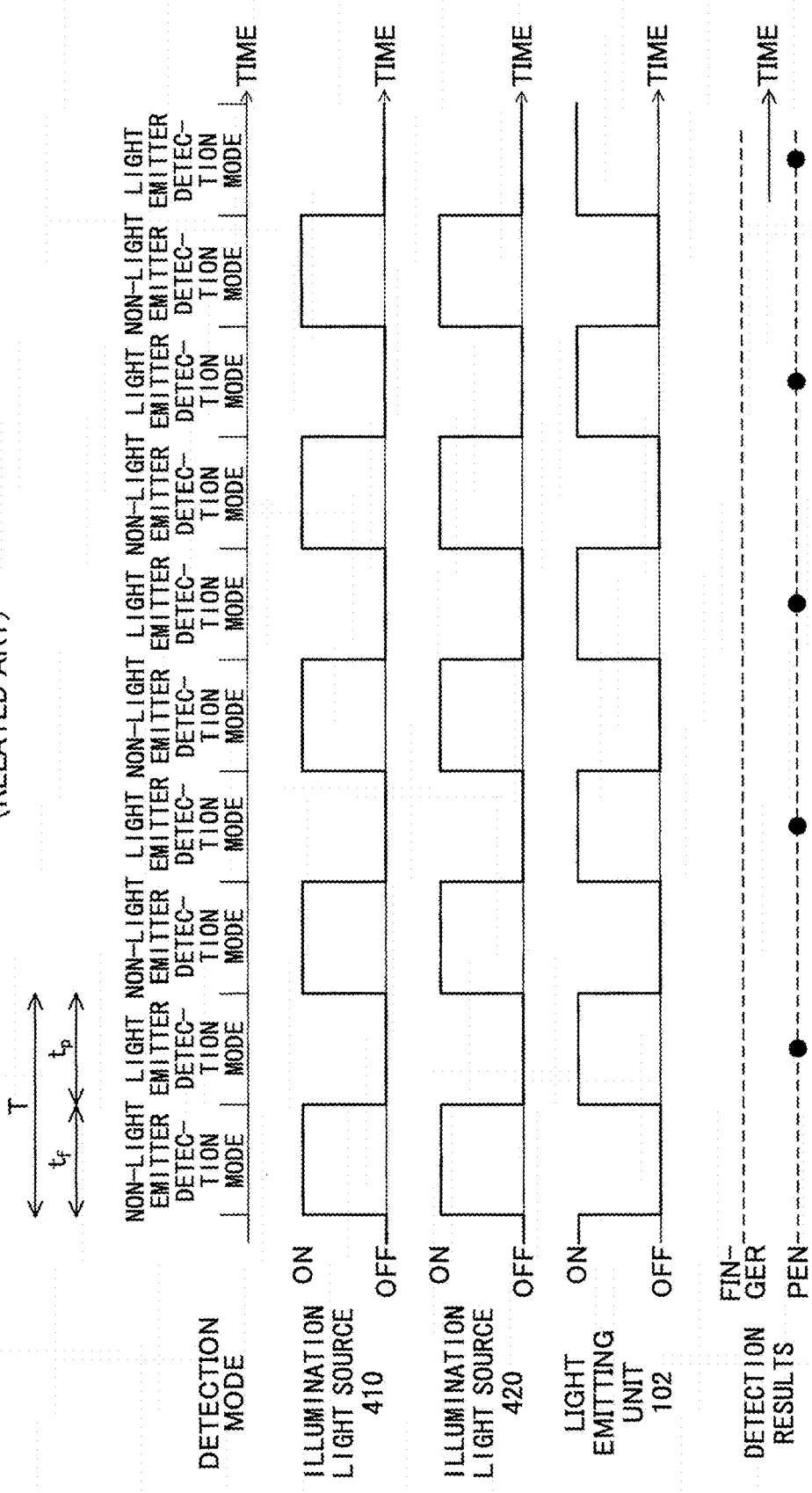

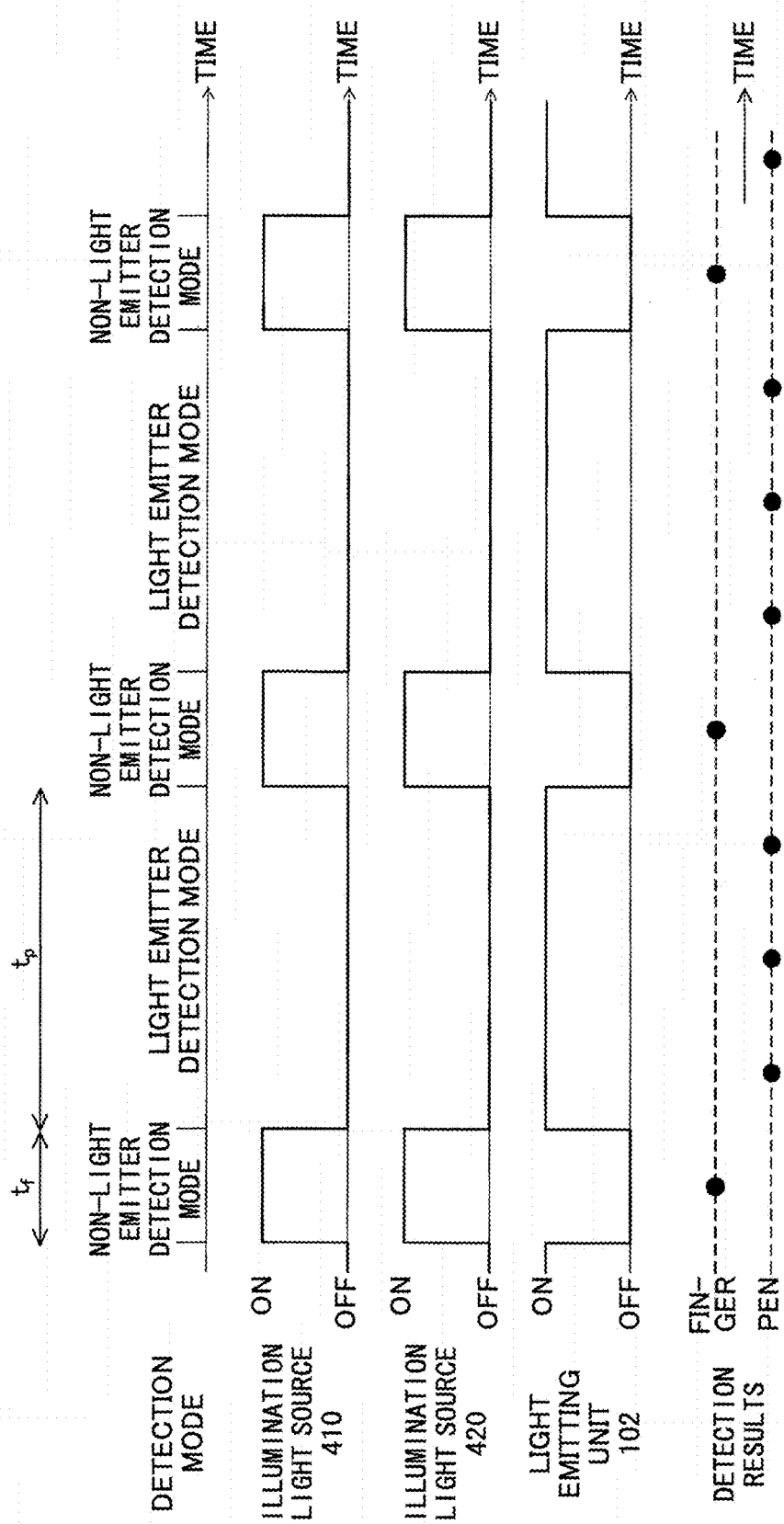

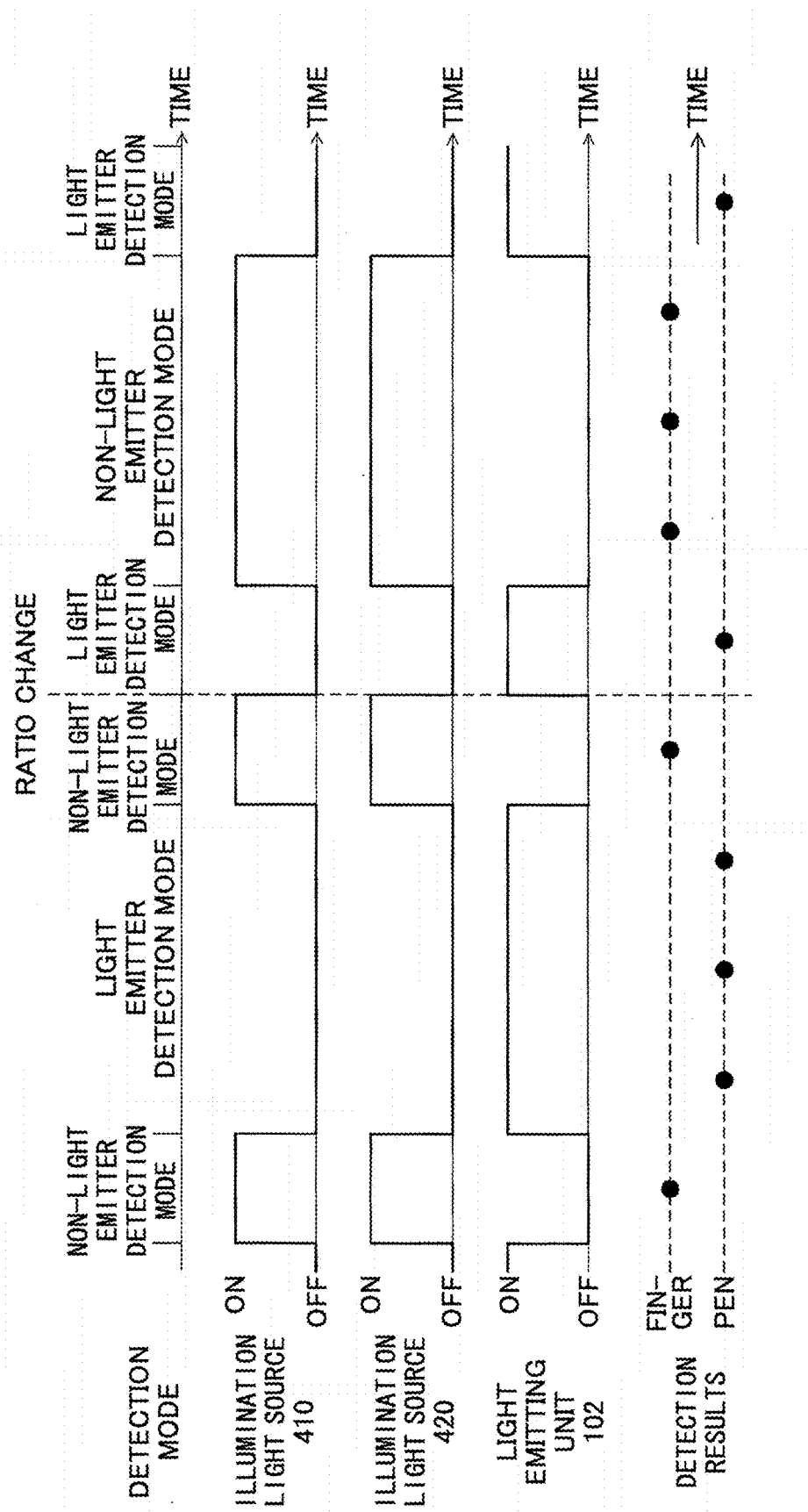
FIG.15 (EMBODIMENT)

* NUMBER OF DETECTION TIMES DURING T [s] IS fT

POSITION DETECTION DEVICE, IMAGE DISPLAY DEVICE AND IMAGE DISPLAY SYSTEM

CROSS-REFERENCE TO RELATED APPLICATIONS

The present application is a continuation application of International Application No. PCT/JP2016/085794, filed Dec. 1, 2016, which claims priority to Japanese Patent Application No. 2015-235410, filed Dec. 2, 2015 and Japanese Patent Application No. 2016-121607, filed Jun. 20, 2016. The contents of these applications are incorporated herein by reference in their entirety.

BACKGROUND OF THE INVENTION

1. Field of the Invention

The disclosures discussed herein relate to a position detection device, an image display device, and an image display system, and more specifically, to a position detection device capable of detecting a position of an object, an image display device including the position detection device, and an image display system including the image display device.

2. Description of the Related Art

Electronic information boards having a flat panel display such as a liquid crystal display with a touch panel have been frequently used in regular meetings and remote meetings.

To use such an electronic information board, a contact position of an electronic pen, an operator's finger, or the like that touches a display area of a display need to be detected.

For example, the coordinate input device disclosed in Patent Document 1 includes a light guide member; an illumination light source coupled to an edge of the light guide member and configured to illuminate inside of the light guide member; at least two direction detectors configured to detect a traveling direction of propagating light propagating inside the light guiding member, the propagating light being generated in response to a non-light emitter and a emitter coming into contact with the light guiding member; an illumination light source blinking unit configured to obtain positional coordinates of the contact point by triangulation, based on detection results of the traveling direction of the propagating light detected by the direction detectors to periodically blink the illumination light source; and a position detector configured to detect a position of a non-light emitter subject to detection during an illumination period of the illumination light source, and to detect a position of a light emitter subject to detection during a non-illumination period of the illumination light source.

RELATED ART DOCUMENT

Patent Document

[Patent Document 1] Japanese Unexamined Patent Application Publication No. 2014-021790

SUMMARY OF THE INVENTION

According to an aspect of the present invention, a position detection device for detecting positions of a non-emitter and an emitter in a detection area is provided. The position detection device includes one or more reflective members disposed around the detection area;
a plurality of illumination light sources configured to emit light toward the reflective member;
a plurality of light receiving sensors configured to receive light reflected by the reflective member and light emitted from the light emitter; and
a control device configured to control the plurality of illumination light sources and the light emitter, wherein
based on previous detection statuses of the non-light emitter and the light emitter, the control device sets a time ratio of a time of a non-light emitter detection mode to a time of a light emitter detection mode, and sets timings of the non-light emitter detection mode and the light emitter detection mode, the non-light emitter detection mode being a mode in which the non-light emitter is subject to detection, and the light emitter detection mode being a mode in which the light emitter is subject to detection.

BRIEF DESCRIPTION OF THE DRAWINGS

Other objects and further features of embodiments will be apparent from the following detailed description when read in conjunction with the accompanying drawings, in which:

FIG. 4 is a diagram illustrating a touch panel;

FIG. 6 is a diagram (part 1) illustrating a non-light emitter detection mode;

FIG. 8 is a diagram (part 2) illustrating a non-light emitter detection mode;

FIG. 9 is a diagram illustrating a light emitter detection mode;

FIG. 11 is a diagram illustrating a difference between a non-light emitter detection mode and a light emitter detection mode;

FIG. 13 is a diagram (part 2) illustrating a related-art time division system;

FIG. 14 is a diagram (part 1) illustrating a time division system according to an embodiment;

FIG. 15 is a diagram (part 2) illustrating a time division system according to an embodiment;

DESCRIPTION OF THE EMBODIMENTS

Figure 1:
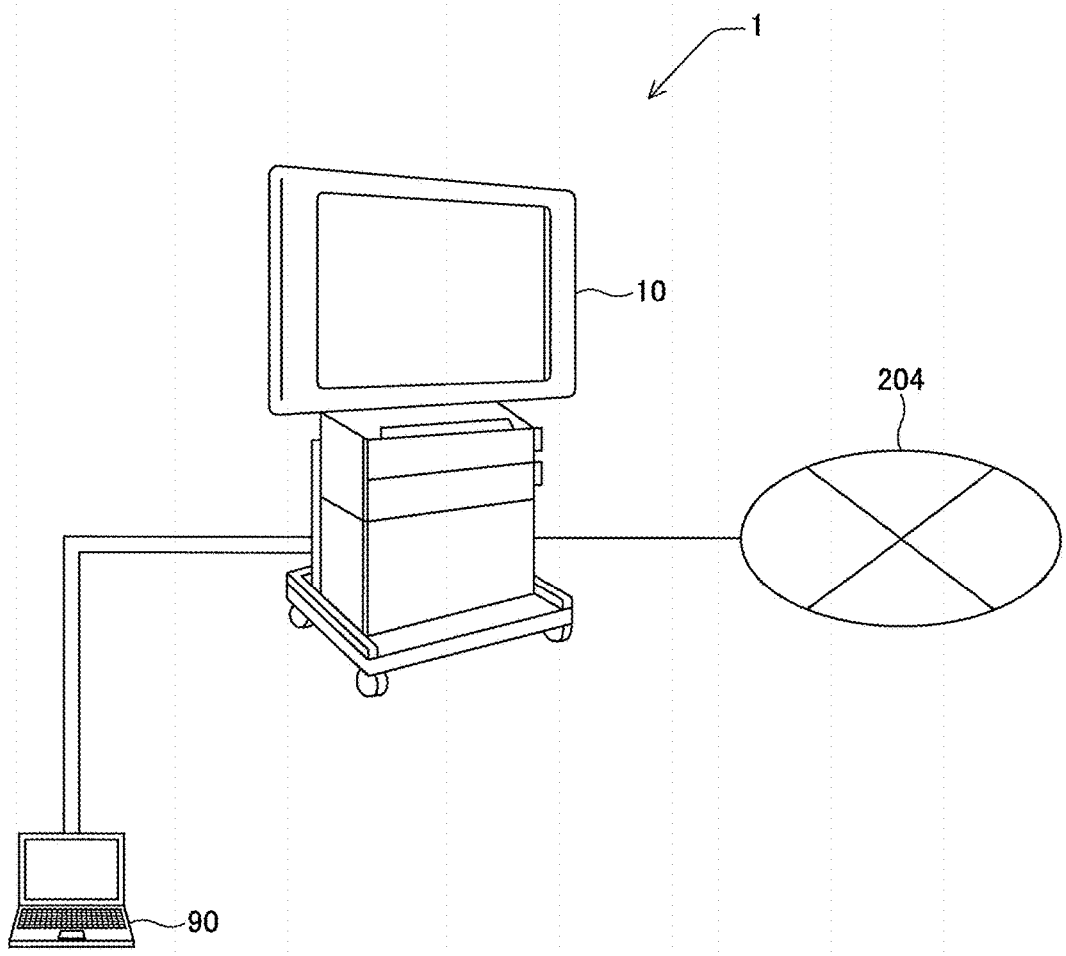
FIG. 1 is a schematic diagram depicting an electronic information board system according to an embodiment of the present invention.

In the following, an embodiment of the present invention is described with reference to FIGS. 1 through 23. FIG. 1 illustrates an electronic information board system 1 as an image display system according to one embodiment.

The electronic information board system 1 includes an electronic information board 10 as an image display device, a laptop computer 90 as a terminal, a network 204, and the like.

The network 204 may be the Internet, a LAN (Local Area Network) or the like.

The laptop computer 90 is connected to the electronic information board 10. The electronic information board 10 is connected to the network 204.

Figure 2:
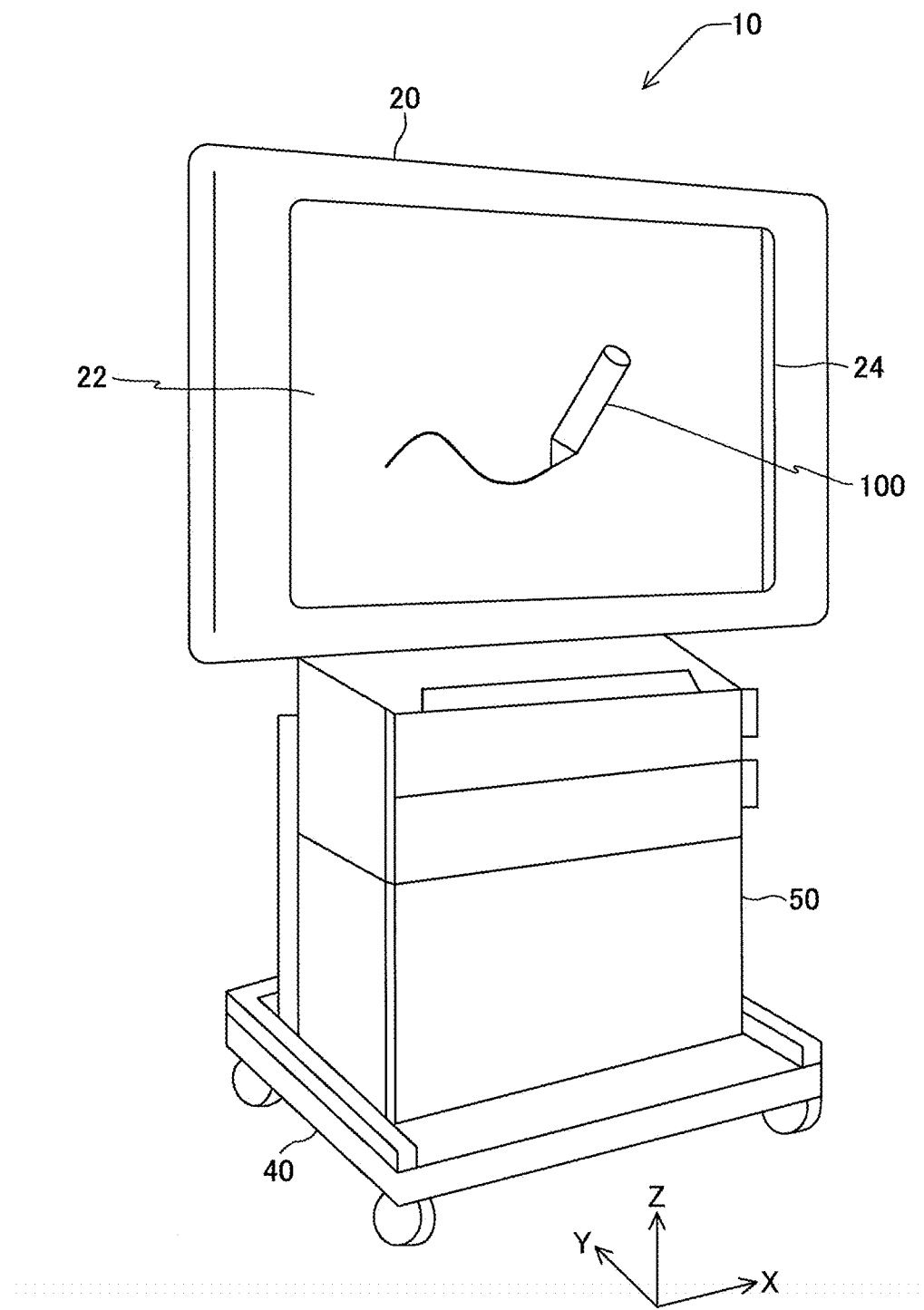
FIG. 2 is an external diagram depicting an electronic information board.
Figure 3A:
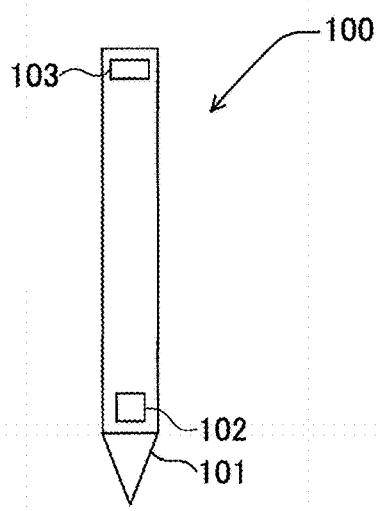
FIG. 3A is a diagram illustrating an electronic pen.
Figure 3B:
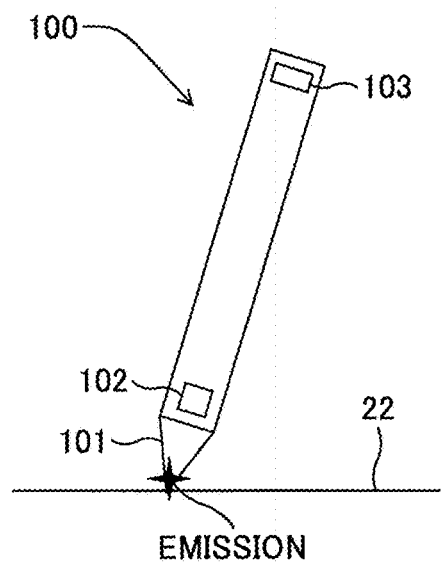
FIG. 3B is a diagram illustrating an electronic pen.
Figure 5:
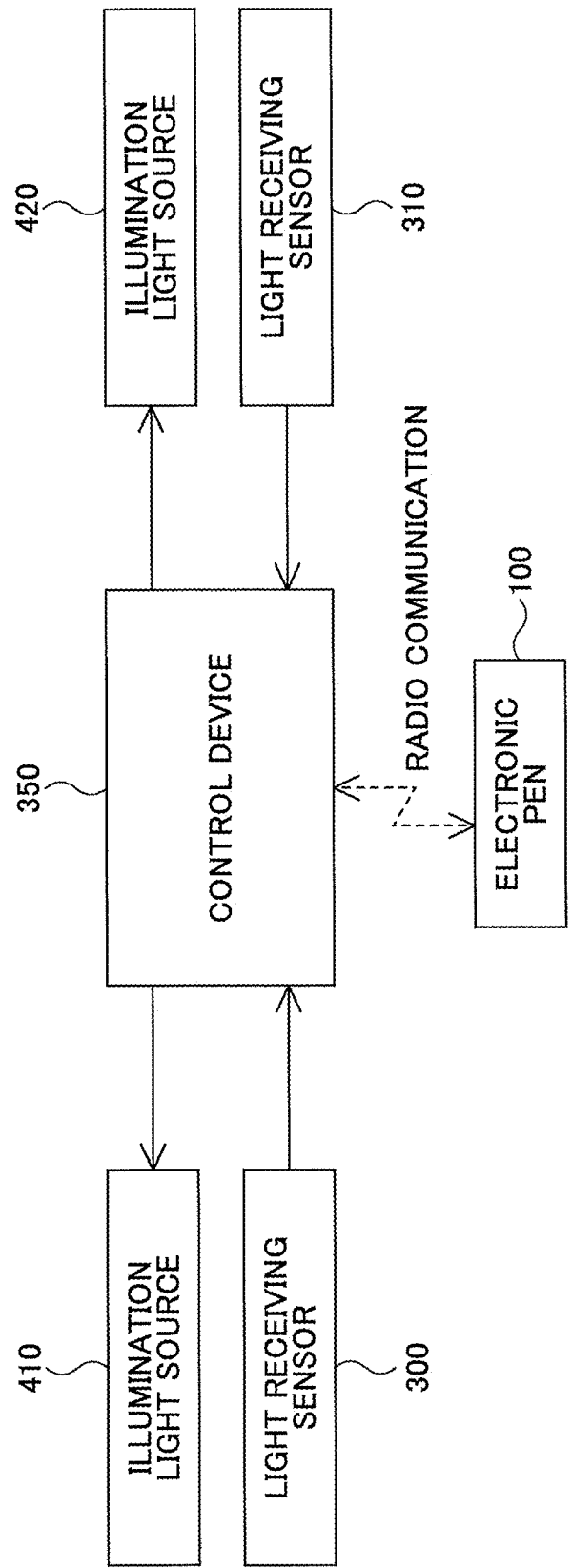
FIG. 5 is a diagram illustrating a control device of the touch panel.

As illustrated in FIG. 2, the electronic information board 10 may include a display 20, a touch panel 24 as a position detection device, a stand 40, a device housing unit 50, and the like. In this specification, an XYZ three-dimensional orthogonal coordinate system is used, where a Z-axis direction is defined as a direction orthogonal to a floor surface on which the electronic information board 10 is installed, and an X-axis direction is defined as a horizontal direction of the display 20. In addition, a +Y direction is defined as a depth direction of the display 20.

The display 20 includes a flat panel such as a liquid crystal panel or a plasma panel. A display surface 22 is formed on a front surface of a casing of the display 20 to display an image, and an operator uses a dedicated electronic pen 100 or the operator's finger to write characters, figures, etc. on the display surface 22.

The electronic pen 100 includes a transparent pen tip 101 (see FIG. 3A) configured to allow light to pass through. In addition, the electronic pen 100 includes a light emitting unit 102 configured to enable the pen tip 101 to emit light (see FIG. 3B).

Further, the electronic pen 100 includes a communication unit 103 configured to perform bidirectional communication by radio with the touch panel 24. When the pen tip 101 is pressed against the display surface 22, the communication unit 103 propagates its effect to the touch panel 24. Further, the communication unit 103 receives a turning-on instruction and a turning-off instruction of the light emitting unit 102 from the touch panel 24.

As illustrated in FIG. 4, the touch panel 24 may include a light receiving sensor 300, a light receiving sensor 310, an illumination light source 410, an illumination light source 420, retroreflectors 430, a control device 350 (not illustrated in FIG. 4, see FIG. 5), and the like.

The light receiving sensor 300 and the illumination light source 410 are disposed at an upper left corner of the display surface 22. The light receiving sensor 310 and the illumination light source 420 are disposed at an upper right corner of the display surface 22.

The respective retroreflectors 430 are disposed at the +X side, −X side, and −Z side of the display surface 22.

Light emitted from the illumination light source 410 travels along the display surface 22, is reflected by the retroreflectors 430, and is received by the light receiving sensor 300.

Light emitted from the illumination light source 420 travels along the display surface 22, is reflected b the retroreflectors 430, and is received by the light receiving sensor 310.

The control device 350 controls turning on (on) and turning off (off) of the illumination light source 410 and the illumination light source 420. Further, the control device 350 obtains positional coordinates of the electronic pen 100 or the operator's finger on the display surface 22 based on outputs of the light receiving sensor 300 and the output of the light receiving sensor 310. Further, the control device 350 performs radio communication with the communication unit 103 of the electronic pen 100 to control turning on (on) and turning off (off) of the light emitting unit 102 the electronic pen 100.

In the following description, a mode in which an operator's finger acts as an object subject to detection is also referred to as a "non-light emitter detection mode", and a mode where the electronic pen 100 acts as an object subject to detection is also referred to as a "light emitter detection mode".

Detection of Positional Coordinates in Non-Light Emitter Detection Mode

In the non-light emitter detection mode, the control device 350 turns on the illumination light source 410 and the illumination light source 420, and turns off the light emitting unit 102 of the electronic pen 100.

When the operator's finger is located on the display surface 22, a part of light emitted from the illumination light source 410 and a part of light emitted from the illumination light source 420 are blocked (shielded) by the operator's finger (hereinafter simply referred to as "finger"). The light blocked by the finger is not received by the light receiving sensors 300 and 310. Light emitted from the illumination light source 410 and the illumination light source 420 at an angle not blocked by the operator's finger is directly reflected by the retroreflectors 430 and received by the light receiving sensors 300 and 310 (see FIG. 6).

Figure 7A:
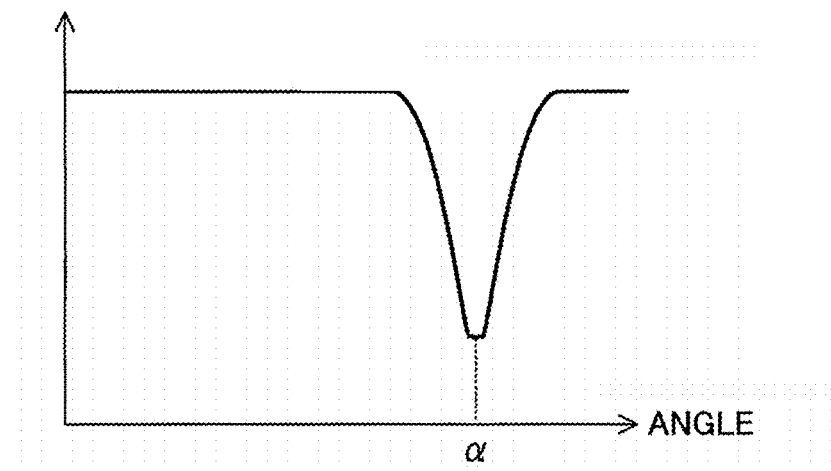
FIG. 7A is a diagram illustrating the amount of light received by one of light receiving sensors in the non-light emitter detection mode.
Figure 7B:
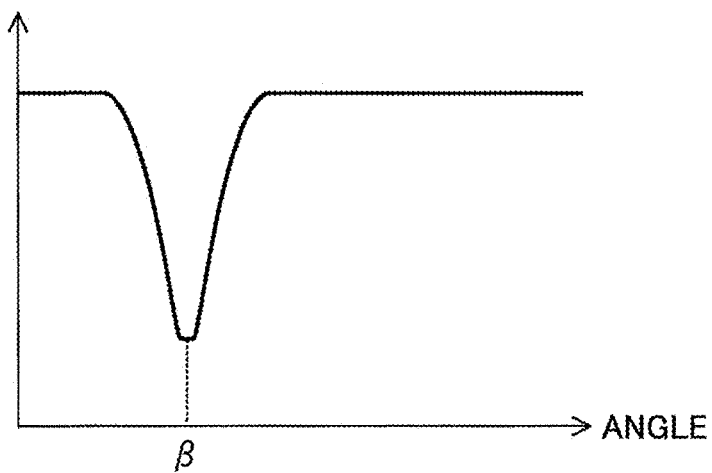
FIG. 7B is a diagram illustrating the amount of light received by the other one of light receiving sensors in the non-light emitter detection mode.

As a result, the amount of light received by the light receiving sensor 300 and the amount of light received by the light receiving sensor 310 change (see FIGS. 7A and 7B).

The control device 350 calculates positional coordinates of the operator's finger on the display surface 22 using triangulation based on outputs of the light receiving sensor 300 and the output of the light receiving sensor 310.

The control device 350 keeps the light emitting unit 102 of the electronic pen 100 turned off even when the control device 350 receives propagation of the electronic pen 100 being pressed against the display surface in the non-light emitter detection mode. Hence, in the non-light emitter detection mode, even when the electronic pen 100 is present on the display surface 22, light emitted from the illumination light source 410 and the illumination light source 420 and directed toward the pen tip 101 of the electronic pen 100 still passes through the pen tip 101 and is directed toward the retroreflectors 430. The light reflected by the retroreflectors 430 is directly received by the light receiving sensors 300 and 310 (see FIG. 8).

That is, in the non-light emitter detection mode, even when the electronic pen 100 is present on the display surface 22, the detection results will not be affected.

Detection of Positional Coordinates in Light Emitter Detection Mode

In the light emitter detection mode, the control device 350 turns off the illumination light source 410 and the illumination light source 420. Further, the control device 350 turns on the light emitting unit 102 of the electronic pen 100 when the control device 350 receives pressure from the electronic pen 100 being pressed against the display surface 22.

Light emitted from the pen point 101 of the electronic pen 100 is received by the light receiving sensor 300 and the light receiving sensor 310 (see FIG. 9).

Figure 10A:
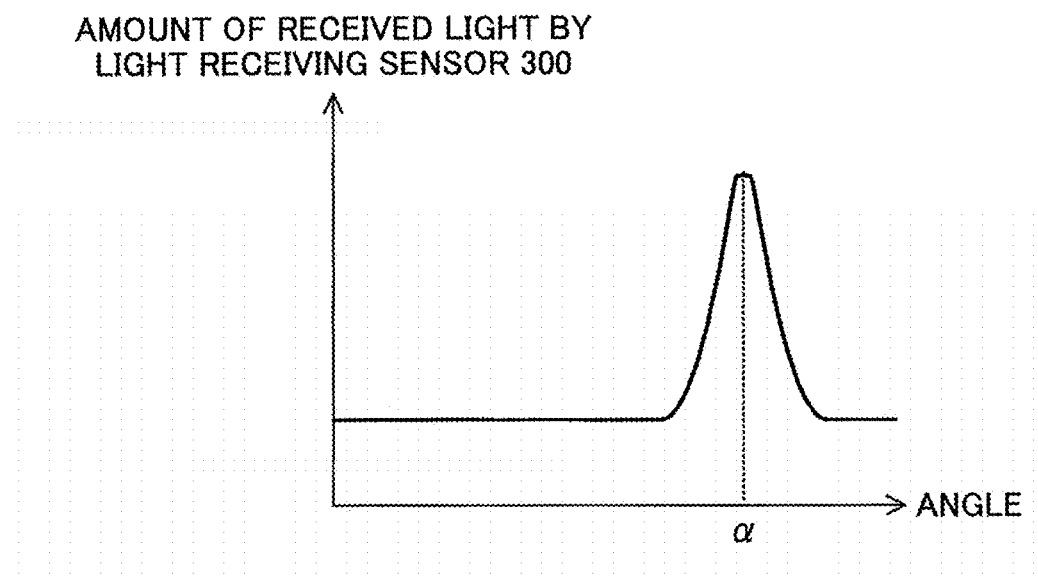
FIG. 10A is a diagram illustrating the amount of light received by one of light receiving sensors in the light emitter detection mode.
Figure 10B:
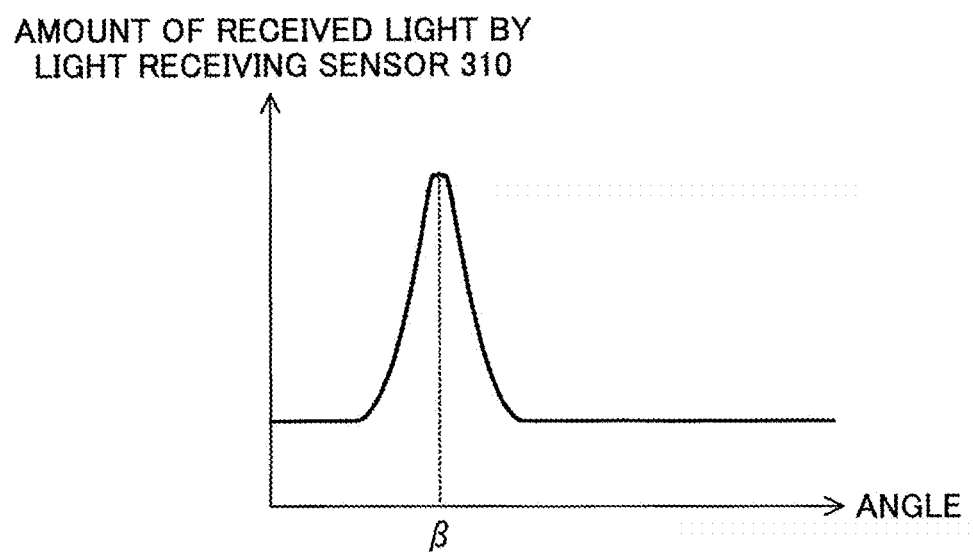
FIG. 10B is a diagram illustrating the amount of light received by the other one of light receiving sensors in the light emitter detection mode.

As a result, the amount of light received by the light receiving sensor 300 and the amount of light received by the light receiving sensor 310 change (see FIGS. 10A and 10B).

The control device 350 calculates positional coordinates of the electronic pen 100 on the display surface 22 using triangulation, based on output of the light receiving sensor 300 and the output of the light receiving sensor 310.

Note that even the operator's finger present on the display surface 22 in the light emitter detection mode, the operator's finger will not be detected by the light receiving sensor 300 and the light receiving sensor 310 due to the illumination light source 410 and the illumination light source 420 being turned off.

That is, in the light emitter detection mode, the detection results will not be affected even when the operator's finger is present on the display surface 22.

FIG. 11 is a diagram illustrating a main difference between the non-light emitter detection mode and the light emitter detection mode. In the non-light emitter detection mode, the illumination light source 410 and the illumination light source 420 are turned on, the light emitting unit 102 is turned off, and the light receiving sensor 300 and the light receiving sensor 310 are enabled to detect the operator's finger alone. In the light emitter detection mode, the illumination light source 410 and the illumination light source 420 are turned off, the light emitting unit 102 is turned on, and the light receiving sensor 300 and the light receiving sensor 310 are enabled to detect only the electronic pen 100.

Therefore, it may be considered to detect a position of the electronic pen 100 and a position of the operator's finger in time division. Here, it is assumed that $t_f$ represents a time of the non-light emitter detection mode and $t_p$ represents a time of the light emitter detection mode. The switching period T in this case expressed by $t_f + t_p$.

Figure 12:
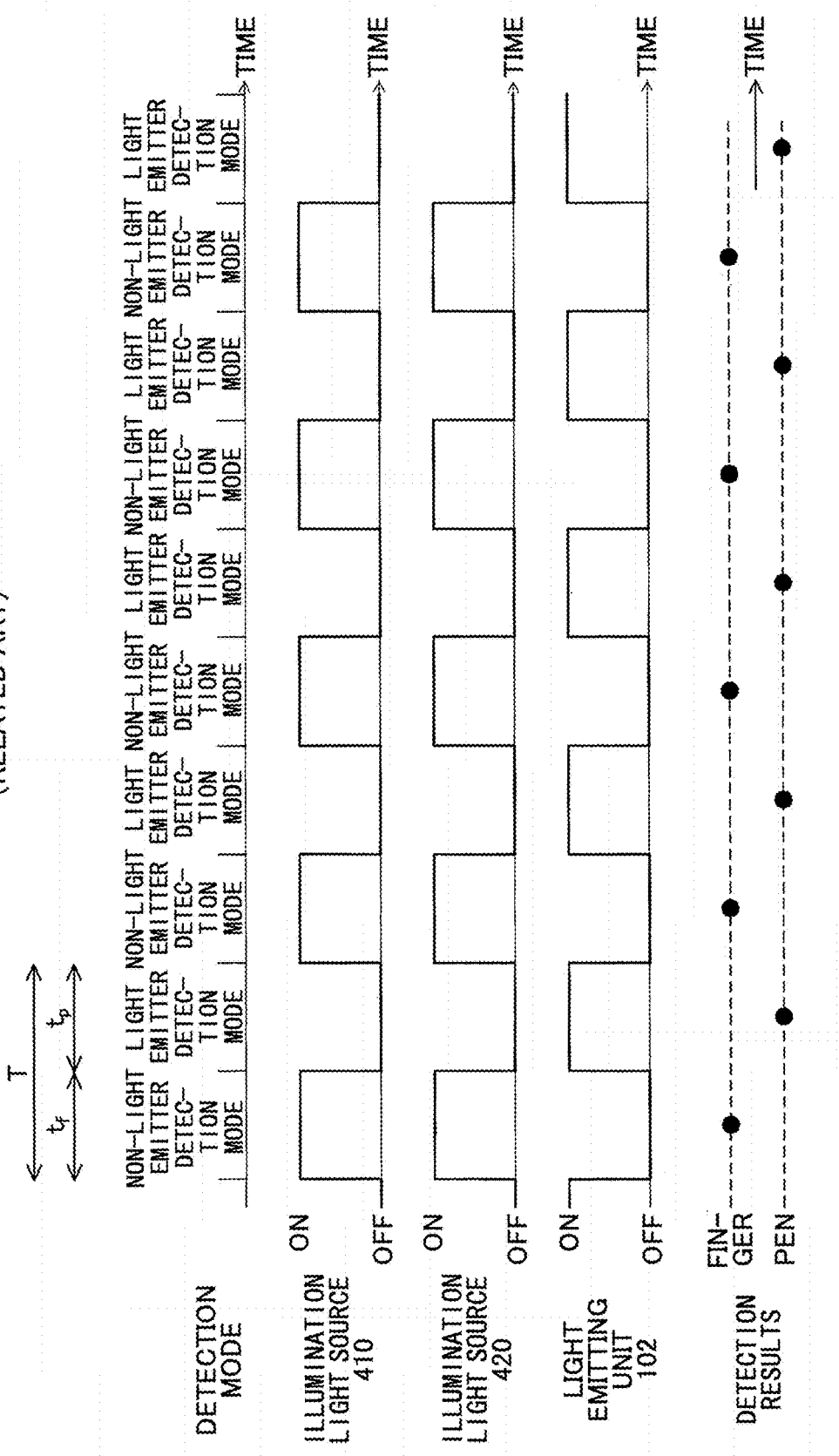
FIG. 12 is a diagram (part 1) illustrating a related-art time division system.

FIG. 12 is a diagram illustrating an example of a related art time division system. In this time division system, it is assumed that the time of each detection mode is set to be: $t = t_f = t_p$, and the light receiving sensor 300 and the light receiving sensor 310 detect the operator's finger or the electronic pen 100 once during one detection mode t [s]. That is, the detection rate of the light receiving sensor is 1/t [Hz].

In the related art tame division system, the switching period T of the detection mode is always constant; thus, the detection rate of the operator's finger and the detection rate of the electronic pen 100 are also constant. In the example of FIG. 12, the light receiving sensor 300 and the light receiving sensor 310 may detect the operator's finger and the electronic pen 100 five times each during $5T=10\ t$ [s].

FIG. 13 is a diagram illustrating a case where no input is made by the operator's finger in the related art time division system. In this case, the light receiving sensor 300 and the light receiving sensor 310 detect the electronic pen 100 only five times despite the fact that the light receiving sensor 300 and the light receiving sensor 310 have a detection performance of 100 ten times.

FIG. 14 is a diagram illustrating a time division system according to an embodiment. In this case, the number of inputs made by the operator's finger is expected to be small; hence, $t_f:t_p=1:3$ is set to increase the ratio of the light emitter detection mode. Although the detection performance of the fight receiving sensor 300 to the light receiving sensor 310 is ten times, which is the same as that of the related art system, the light receiving sensor 300 and the light receiving sensor 310 are enabled to detect the electronic pen 100 seven times as a result.

In the present embodiment, a future input status is predicted from the input status by the operator's finger and the input status by the electronic pen 100 within a previous certain time, and an optimum ratio of the time $t_f$ of the non-light emitter detection mode to the time $t_p$ of the light emitter detection mode is calculated.

The control device 350 controls the illumination light source 410, the illumination light source 420, and the light emitting unit 102 to switch a detection mode, based on the calculated ratio, and calculates the positional coordinates of the operator's finger and the positional coordinates of the electronic pen 100 from the output of the light receiving sensor 300 and the output of the light receiving sensor 310.

FIG. 15 is a diagram illustrating an example where a ratio of time $t_f$ of the non-light emitter detection mode to time $t_p$ of the light emitter detection mode is changed during the detection in the present embodiment.

Thus, sucessively performing the process of optimizing a ratio of time $t_f$ of the non-light emitter detection mode to time $t_p$ of the light emitter detection mode in this manner will increase the number of detection times of the operator's finger or the number of detection times of the electronic pen 100 in accordance with the input status by the operator's finger and the input status by the electronic pen 100 compared to the related art time division system. This will improve detection accuracy of the operator's finger and detection accuracy of the electronic pen 100.

The following illustrates an example of a method of calculating a ratio of the time $t_f$ of the non-light emitter detection mode to the time $t_p$ of the light emitter detection mode.

Note that f [Hz] represents a detection rate of the touch panel 24 and T represents an update period of the detection mode ratio. Further, $N_f$ represents the number of inputs made by the operator's finger and $N_p$ represents the number of inputs made by the electronic pen 100, within a previous predetermined time.

$L_f$ represents the sum of the amounts of change in the positional coordinates at the time of input made by the operator's finger, and $L_p$ represents the sum of the amounts of change in the positional coordinates at the time of input made by the electronic pen 100.

In addition, s represents the weighting coefficient of the non-light emitter detection mode at design time and 1−s represents the weighting coefficient of the light emitter detection mode.

In this case, the ratio of the time $t_f$ of the non-light emitter detection mode to the time $t_p$ of the light emitter detection mode within T [s] is calculated by the following equation (1).

$$t_f : t_p = sN_f L_f : (1-s) N_p L_p \quad (1)$$

Figure 16A:
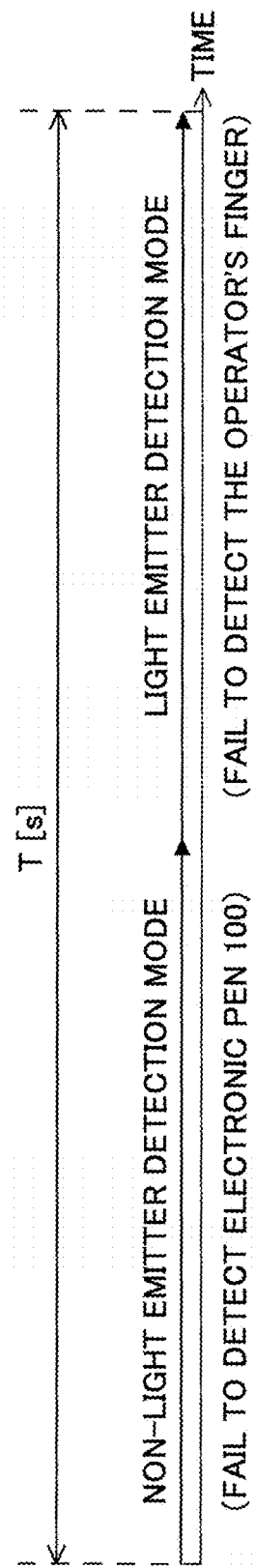
FIG. 16A is a diagram (part 1) illustrating a method of calculating the ratio of a time of the non-light emitter detection mode to a time of the light emitter detection mode.
Figure 16B:
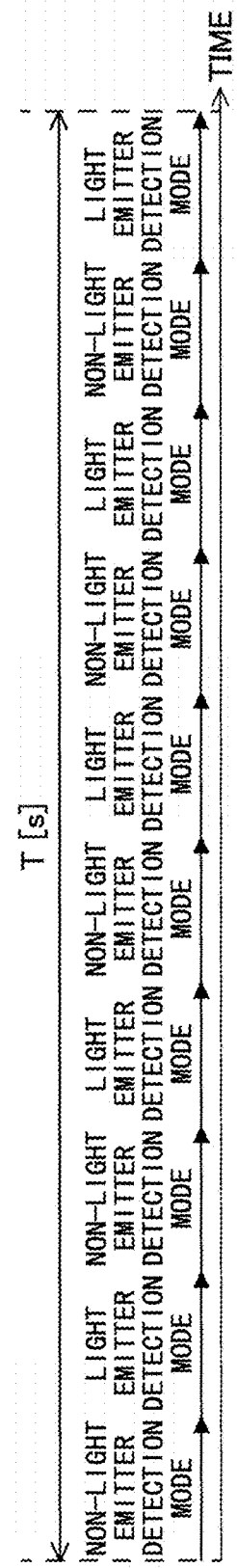
FIG. 16B is another diagram (part 1) illustrating a method of calculating the ratio of a time of the non-light emitter detection mode to a time of the light emitter detection mode.

Note that as illustrated in FIG. 16A, when each of the detection modes is axed, a time of failing to detect the operator's finger or the electronic pen 100 will be long. Therefore, while retaining the ratio pf the time $t_f$ of the non-light emitter detection mode to the time $t_p$ of the light emitter detection mode, the detection modes are switched to become dispersed within a range of the detection rate of the touch panel 24 (see FIG. 16B).

From among the time $t_f$ of the non-light emitter detection mode and the time $t_p$ of the light emitter detection mode obtained by the above equation (1), let the detection mode A represent a longer detection mode and $t_A$ represent its detection time, and let the detection mode B represent a shorter detection mode and $t_B$ represent its detection time.

Assuming that the number of detection times of the detection mode B during T [s] is n, and the number of detection times of the detection mode A is fT−n, the following equation (2) is obtained.

$$t_A : t_B = fT - n : n \quad (2)$$

To solve the equation (2) above with respect to n, the following equation (3) is obtained.

$$n = \frac{t_B}{t_A + t_B} fT \quad (3)$$

Further, in order to take full advantage of the performance of the touch panel 24, when the time of one shorter detection mode B is applied to the detection rate f [Hz] of the touch panel 24, 1/f [s] is obtained.

Figure 17:
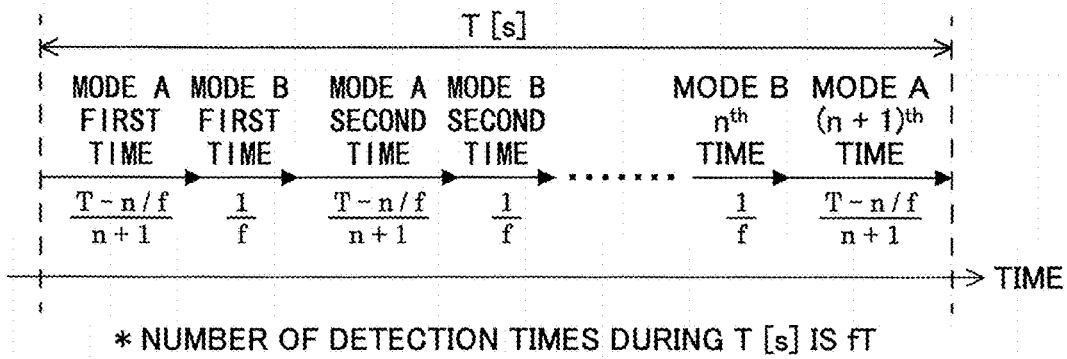
FIG. 17 is a diagram (part 2) illustrating a method of calculating the ratio of a time of the non-light emitter detection mode to a time of the light emitter detection mode.

As illustrated in FIG. 17, when the detection mode A and the detection mode B are alternately switched, the number of longer detection modes A during T [s] is n+1 times.

Therefore, the time of one longer detection mode A is represented by the following equation (4).

$$\text{TIME OF ONE DETECTION MODE } A = \frac{T - n/f}{n+1} \quad (4)$$

Therefore, when the time $t_f$ of the non-light emitter detection mode is longer than the time $t_p$ of the light emitter detection mode, the following equations (5), (6), and (7) are obtained.

$$\text{TIME OF ONE NON-LIGHT EMITTER DETECTION MODE} = \frac{T - n/f}{n+1} \quad (5)$$

$$n = \frac{t_p}{t_f + t_p} fT \quad (6)$$

$$\text{TIME OF ONE LIGHT EMITTER DETECTION MODE} = \frac{1}{f} \quad (7)$$

Meanwhile, when the time $t_f$ of the light emitter detection mode is shorter than or equal to the time $t_p$ of the light emitter detection mode, the following equations (8), (9), and (10) are obtained.

$$\text{TIME OF ONE NON-LIGHT EMITTER DETECTION MODE} = \frac{1}{f} \quad (8)$$

$$\text{TIME OF ONE LIGHT EMITTER DETECTION MODE} = \frac{T - n/f}{n+1} \quad (9)$$

$$n = \frac{t_f}{t_p + t_f} fT \quad (10)$$

Figure 18:
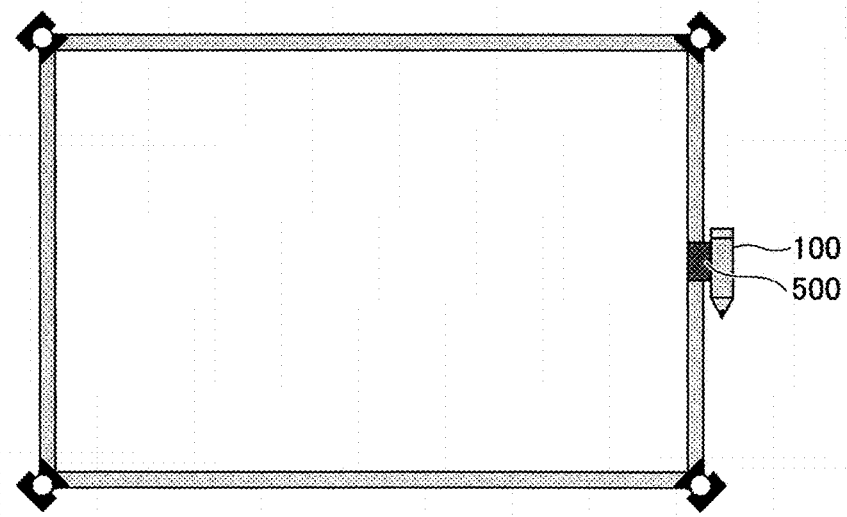
FIG. 18 is a diagram (part 1) illustrating a housing unit.
Figure 19:
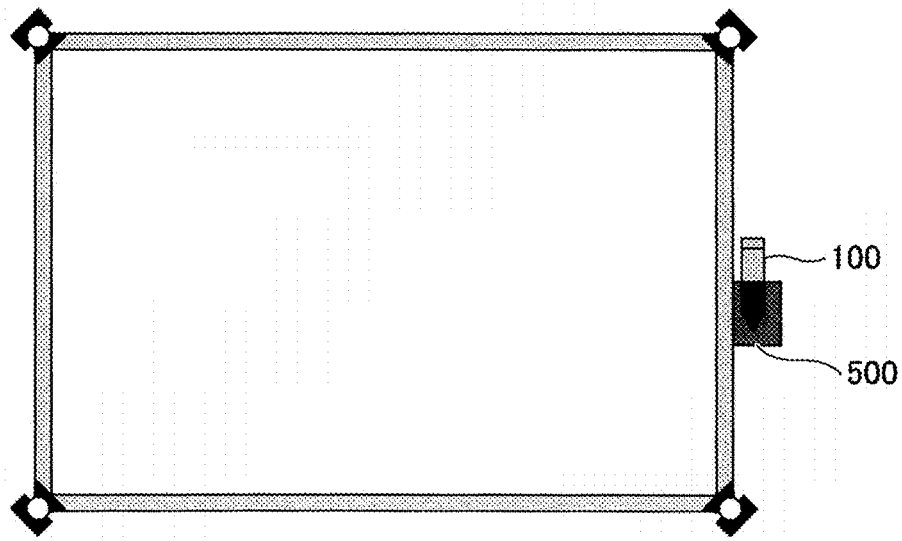
FIG. 19 is a diagram (part 2) illustrating a housing unit.
Figure 20:
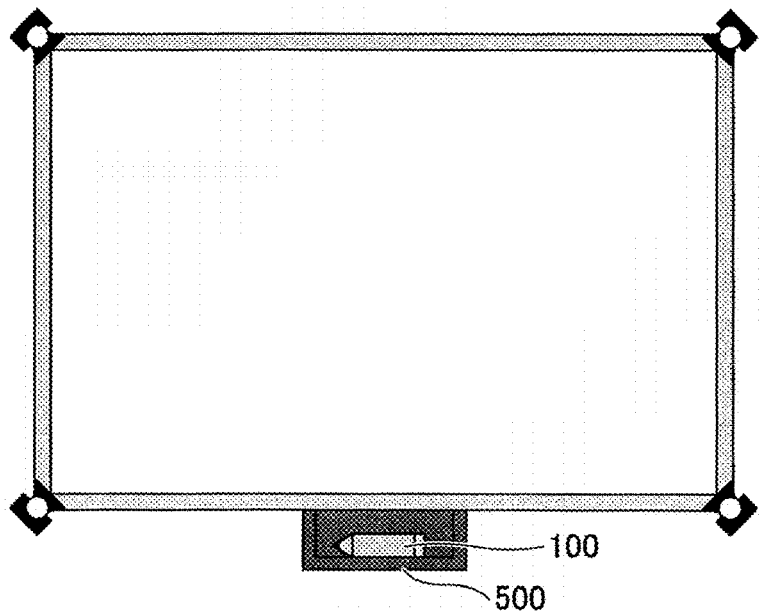
FIG. 20 is a diagram (part 3) illustrating a housing unit.

Next, FIGS. 18 to 20 illustrate cases where a housing unit 500 capable of storing the electronic pen 100 is provided, and information as to whether the electronic pen 100 is stored in the housing unit 500 is transmitted to the control device 350.

In FIG. 18, a holder is used for the housing unit 500, and the electronic pen 100 is fixed to the holder with a magnet. In FIG. 19, a stand is used for the housing unit 500, and the electronic pen 100 is stored in the stand. In FIG. 20, a tray is used for the housing unit 500, and the electronic pen 100 is stored in the tray.

Further, as a method of determining whether the electronic pen 100 is stored in the housing unit 500, an electrical method, an optical method, and a mechanical method are available. The electrical method may use an electrical contact, for example. The optical method may use an optical sensor, for example. The mechanical method may use a depression switch, for example.

Figure 21:
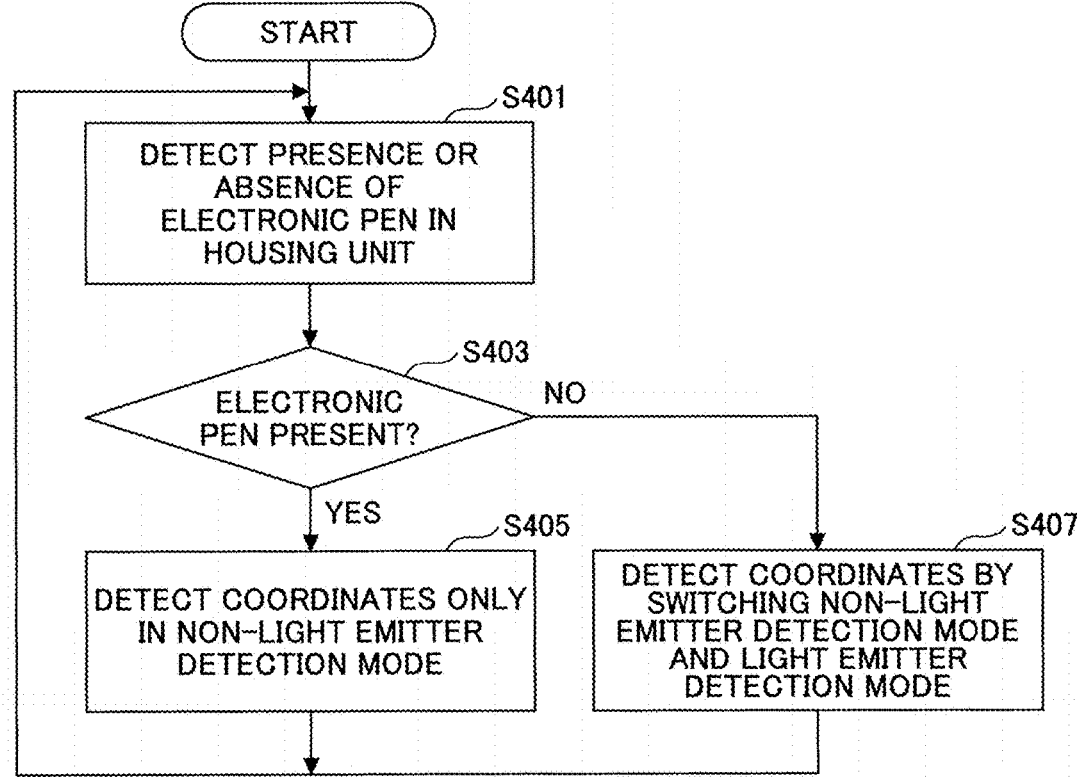
FIG. 21 is a flowchart illustrating an operation (part 1) of a control device in a case of having a housing unit.

FIG. 21 is a flowchart illustrating operations in the control device 350 in such a case.

In initial step S401, the control device 350 acquires information on the presence or absence of the electronic pen 100 in the housing unit 500.

In a subsequent step S403, the control device 350 determines the presence or absence of the electronic pen 100. In a case where the electronic pen 100 is stored in the housing unit 500, the determination in this step is affirmative, and the process proceeds to step S405.

In step S405, coordinates are detected only in the non-light emitter detection mode. This is because it is determined that the electronic pen 100 is not used.

In a case where the control device 350 determines that the electronic pen 100 is not stored in the housing unit 500 in step S403, the determination in step S403 is negative, and the process proceeds to step S407.

In step S407, coordinates are detected by switching between the non-light emitter detection mode and the light emitter detection mode by the above-described time division system.

This will improve the detection accuracy.

Further, the following illustrates a case where the housing unit 500 is enabled to store multiple electronic pens 100 and the control device 350 is enabled to obtain information on the number of stored electronic pens 100. In this case, it is assumed that multiple sets of light receiving sensors are provided.

Figure 22:
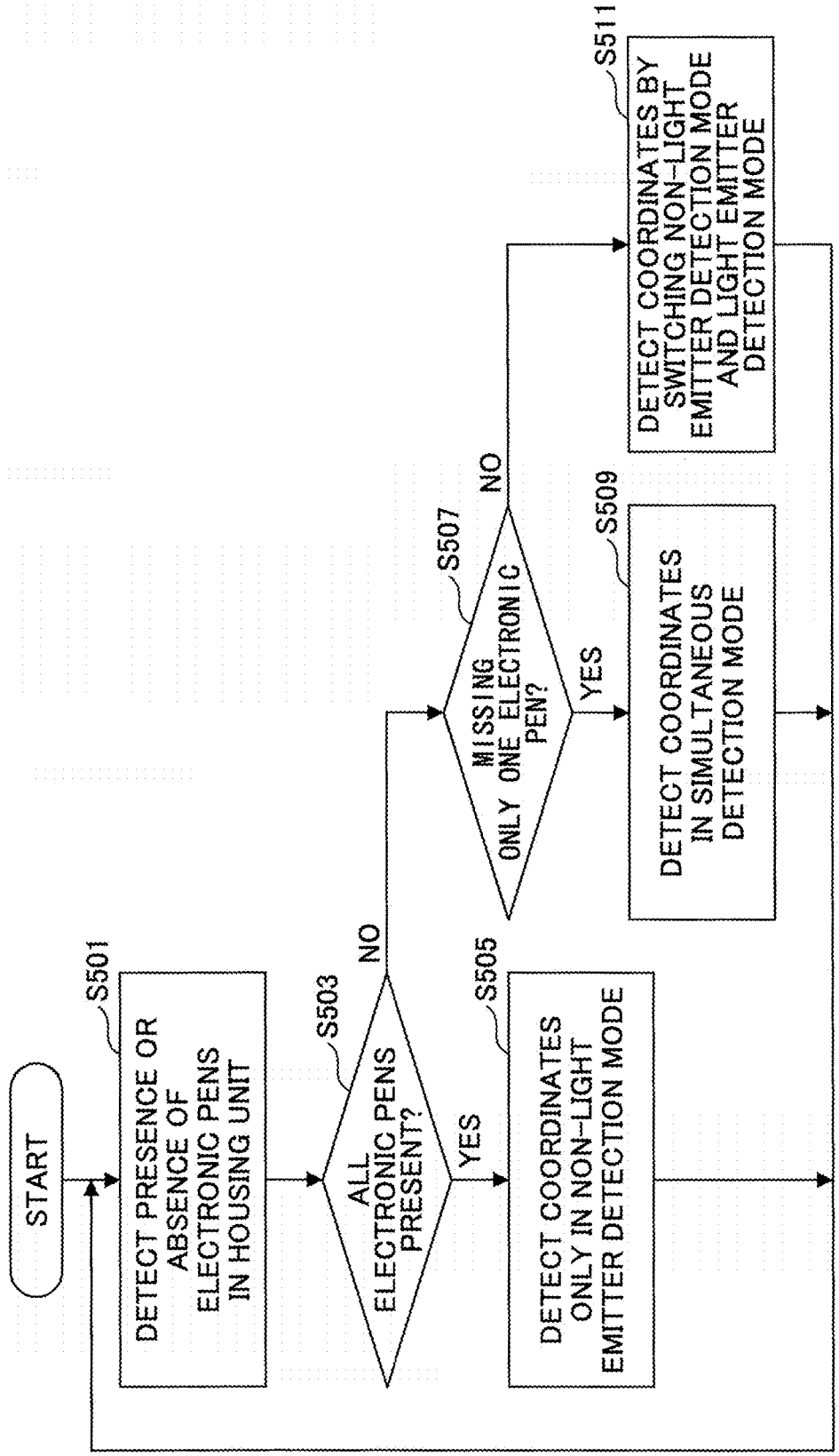
FIG. 22 is a flowchart illustrating an operation (part 2) of a control device in a case of having a housing unit.
Figure 23:
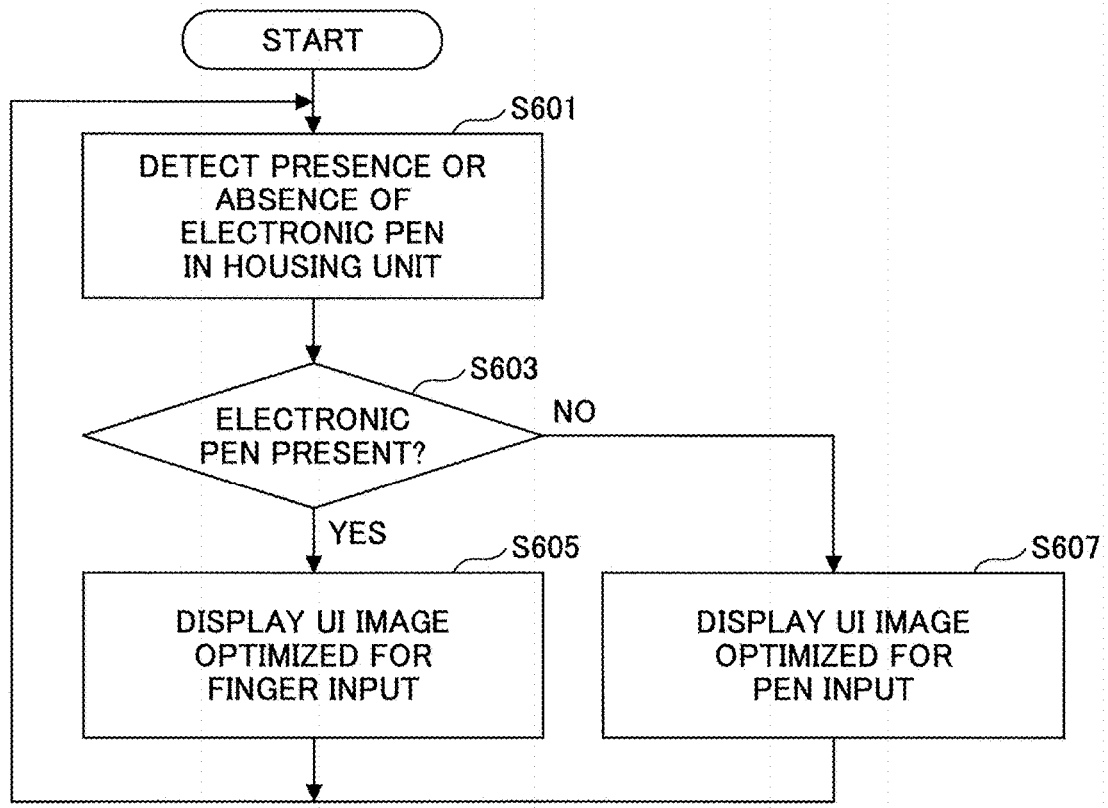
FIG. 23 is a flowchart illustrating an operation (part 3) of a control device in a case having a housing unit.

FIG. 22 is a flowchart illustrating operations in the control device 350 in such a case.

In an initial step S501, the control device 350 acquires information on the presence or absence of the electronic pens 100 in the housing unit 500.

In a subsequent step S503, the control device 350 determines whether all the electronic pens 100 are stored in the housing unit 500. In a case where all the electronic pens 100 are stored in the housing unit 500, the determination in this step is affirmative, and the process proceeds to step S505.

In step S505, coordinates are detected only in the non-light emitter detection mode. This is because it is determined that the electronic pens 100 are not used.

In a case where the control device 350 determines that all the electronic pens 100 are not stored in the housing unit 500 in step S503, the determination in step S503 is negative, and the process proceeds to step S507.

In step S507, the control device 350 determines whether the number of missing electronic pens 100 in the housing unit 500 is only one. In a case where the number of missing electronic pens 100 in the housing unit 500 is only one, the determination in this step is affirmative, and the process proceeds to step S509.

In step S509, coordinates are detected in a simultaneous detection mode. In the simultaneous detection mode, the coordinates of the electronic pen 100 are detected by one set of light receiving sensors and the operator's finger is detected by another set of light receiving sensors.

In a case where the control device 350 determines that the number of missing electronic pens 100 in the housing unit 500 is not only one step S507, the determination in step S507 is negative, and the process proceeds to step S511.

In step S511, coordinates are detected by switching between the non-light emitter detection mode and the light emitter detection mode by the above-described time division system.

Further, the control device 350 may change a UI (user interface) image in accordance with whether an electronic pen 100 is stored in the housing unit 500. This is because the UI image suitable for pen input may differ from the UI image suitable for finger input. This may improve operability.

FIG. 33 is a flowchart illustrating operations in the control device 350 in such a case.

In an initial step S601, the control device 350 acquires information on the presence or absence of the electronic pen 100 in the housing unit 500.

In a subsequent step S603, the control device 350 determines the presence or absence of the electronic pen 100. In a case where the electronic pen 100 is stored in the housing unit 500, the determination in this step is affirmative, and the process proceeds to step S605.

In this step S605, the image optimized for finger input is displayed. This is because it is determined that the electronic pen 100 is not used.

In a case where the control device 350 determines that the electronic pen 100 is not stored in the housing unit 500 in step S603, the determination in step S603 is negative, and the process proceeds to step S607.

In this step S607, the UI image optimized for pen input is displayed.

Further, in a case where the control device 350 is configured to store multiple electronic pens 100 in the housing unit 500 and to obtain information on the number of stored electronic pens 100, the control device 350 may display a UI image accordance with the number of electronic pens 100 taken out from the housing unit 500. This may further improve operability.

As is clear from the above description, in the touch panel 24 according to the present embodiment, the operator's finger is a non-light emitter and the electronic pen 100 is a light emitter.

As described above, the touch panel 24 according to the present embodiment includes the light receiving sensor 300, the light receiving sensor 310, the illumination light source 410, the illumination light source 420, the retroreflectors 430, the control device 350, and the like.

The retroreflectors 430 are disposed around the display surface, and the illumination light source 410 and the illumination light source 420 emit light toward the retroreflectors 430. The light receiving sensor 300 and the light receiving sensor 310 receive light reflected by the retroreflectors 430 and light emitted from the electronic pen 100.

The control device 350 controls the illumination light source 410, the illumination light source 420 and the light emitting unit 102 of the electronic pen 100, and sets the time ratio and the timings of the non-light emitter detection mode and the light emitter detection mode, based on the previous detection statuses of the operator's finger and the electronic pen 100.

In this case, it is possible to prevent detection accuracy from deteriorating while setting both the operator's finger and the electronic pen 100 as detection targets.

In the above embodiment, is also possible to add another light receiving sensors so as to detect positional coordinates of multiple non-light emitters and multiple light emitters.

Further, in the above embodiment, at least one of the time ratio and the timings of the non-light emitter detection mode and the light emitter detection mode may be set by an operator.

Further, in the above embodiment, the control device 350 may have a function of learning information previously input by the operator's finger and the electronic pen 100.

Since the electronic information board 10 has the touch panel 24, the electronic information board 10 is enabled to perform processing in accordance with an operator's requests.

In addition, since the electronic information board system 1 includes the electronic information board 10, an intended presentation and an efficient conference may be conducted as a result.

Further, in the above-described embodiment, a case where an electronic pen having a light emitting unit is used as a light emitter has been described; however, the present invention is not limited thereto. That is, the control device 350 is only required to have a light emitting unit configured to be turned on and off.

Further, in the above-described embodiment, a case where the operator's finger is used as a non-light emitter has been described; however, the present invention is not limited thereto. For example, a pointing rod or an electronic pen not having a light emitting unit may be used as a non-light emitter.

In the above embodiment, a case where the touch panel 24 is used for the electronic information board 10 has been described; however, the present invention is not limited thereto. For example, the touch panel 24 may be used in a projector device or a digital signage device.

The position detection device according to present invention is enabled to control against deterioration of detection accuracy while setting both a non-light emitter and a light emitter as detection targets.

Further, the present invention is not limited to these embodiments and examples described above, but various variations and modifications may be made without departing from the scope of the present invention.

What is claimed is:

1. A position detection device for detecting positions of a non-light emitter and a light emitter in a detection area, the position detection device comprising:
one or more reflective members disposed around the detection area;
a plurality of illumination light sources configured to emit light toward the reflective member;

a plurality of light receiving sensors configured to receive light reflected by the reflective member and light emitted from the light emitter; and a control device configured to control the plurality of illumination light sources and the light emitter, wherein based on previous detection statuses of the non-light emitter and the light emitter, the control device sets a time ratio of a time of a non-light emitter detection mode to a time of a light emitter detection mode, and sets timings of the non-light emitter detection mode and the light emitter detection mode, the non-light emitter detection mode being a mode in which the non-light emitter is subject to detection, and the light emitter detection mode being a mode in which the light emitter is subject to detection.

2. The position detection device according to claim 1, wherein
the previous detection statuses include the number of times input by the non-light emitter and the number of times input by the light emitter within a previous predetermined time.

3. The position detection device according to claim 1, wherein
the previous detection statuses include a total amount of a change in positional coordinates at a time of input made by the non-light emitter and a total amount of a change in positional coordinates at a time of input made by the light emitter, within a previous predetermined time.

4. The position detection device according to claim 1, wherein
for setting the time ratio and the timing, the control device accounts for a weighting coefficient of the non-light emitter detection mode and a weighting coefficient of the light emitter detection mode in design phase.

5. The position detection device according to claim 1, wherein
in the non-light emitter detection mode, the control device turns on the plurality of illumination light sources and turns off the light emitter, and in the light emitter detection mode, the control device turns off the plurality of illumination light sources and turns on the light emitter.

6. The position detection device according to claim 1, further comprising:
a housing unit configured to store light emitter, wherein
the control device detects a position by switching between the non-light emitter detection mode and the light emitter detection mode in response to the light emitter being not stored in the housing unit, and the control device detects a position in the non-light emitter detection mode alone in response to the light emitter being stored in the housing unit.

7. The position detection device according to claim 1, further comprising:
a housing unit configured to store a plurality of light emitters, wherein
the control device changes a detection mode in accordance with the number of the light emitters stored in the housing unit.

8. The position detection device according to claim 7, wherein
the plurality of light receiving sensors include two sets of light receiving sensors, and
in response to one of the light emitters being taken out from the housing unit, the control device detects a position of the non-light emitter with a first set of light receiving sensors, and detects a position of the light emitter with a second set of light receiving sensors.

9. The position detection device according to claim 1, further comprising:
a housing unit configured to store a light emitter, wherein
the control device displays a UI image suitable for the light emitter in the detection area in response to the light emitter being not stored in the housing unit, and displays a UI image suitable for the non-light emitter in the detection area in response to the light emitter being stored in the housing unit.

10. The position detection device according to claim 1, further comprising:
a housing unit configured to store a plurality of light emitters, wherein
the control device displays in the detection area a UI image in accordance with the number of the light emitters taken out from the housing unit.

11. An image display device comprising:
the position detection device according to claim 1.

12. An image display system comprising:
the image display device according to claim 11; and
a terminal configured to transfer an image to the image display device.

13. The image display system according to claim 12, wherein
the image display device is a projector device.

14. The image display system according to claim 12, wherein
the image display device is an electronic information board.

15. The image display system according to claim 12, wherein
the image display device is a digital signage device.

* * * * *